W. H. BUTTERS.
AUTOMOBILE JACK.
APPLICATION FILED OCT. 29, 1919.

1,340,749.

Patented May 18, 1920.

WITNESSES
A. R. Appleman
S. W. Foster

INVENTOR
WILLIAM H. BUTTERS.
BY Munn & Co.
ATTORNEYS

UNITED STATES PATENT OFFICE.

WILLIAM HENRY BUTTERS, OF CALGARY, ALBERTA, CANADA.

AUTOMOBILE-JACK.

1,340,749.  Specification of Letters Patent.  Patented May 18, 1920.

Application filed October 29, 1919. Serial No. 334,187.

*To all whom it may concern:*

Be it known that I, WILLIAM H. BUTTERS, a subject of the King of Great Britain, and a resident of Calgary, in the Province of Alberta and Dominion of Canada, have invented a new and Improved Automobile-Jack, of which the following is a full, clear, and exact description.

This invention relates to improvements in automobile jacks, an object of the invention being to provide a jack onto which an automobile can be easily run and can be elevated or tilted to any desired angle and held in this position as long as desired.

A further object is to provide an improved construction of carrier and improved means for operating the same to elevate and lower an automobile.

With these and other objects in view the invention consists in certain novel features of construction, and combinations and arrangements of parts, as will be more fully hereinafter described and pointed out in the claims.

In the accompanying drawings—

Figure 1:
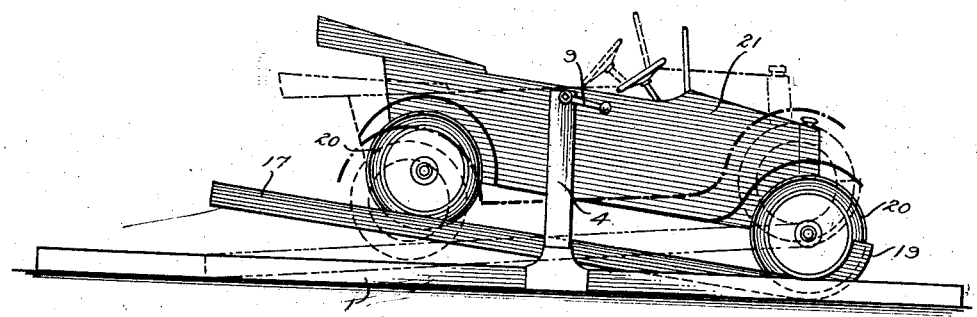
Figure 1 is a view in side elevation illustrating my improvements.

1, 1, represent base bars which are preferably of channel iron spaced apart and connected by transverse rods 2 forming a rigid base. Hollow uprights 4 are secured to the intermediate portions of the base bars 1, and these hollow uprights 4 house vertically positioned rotary screws 5. Intermeshing spiral gears 6 and 7 are provided at the upper portions of the uprights 4, whereby power is transmitted from a shaft 8 to the screws 5, and a removable crank arm 9 may be positioned on the shaft 8 to turn the gears.

Similar spiral gears 10 and 11 operatively connect the lower portions of the screws 5 with a transverse shaft 12 so that when one screw 5 is turned, a similar motion is imparted to the other screw 5. In both of the uprights 4 pinions 13 are located and mesh with the screws 5 and also mesh with vertical racks 14 in the uprights so that when the screws are turned in one direction, the pinions are elevated, and when the screws are turned in the other direction, the pinions are lowered, as will be readily understood.

The pinions 13 support a transverse shaft 15 and on this shaft 15 bifurcated blocks or brackets 16 are located and support channel-shaped tracks 17. The tracks 17 are secured in the brackets 16 by set screws 18 so as to permit the tracks the desired longitudinal adjustment to accommodate various lengths of automobiles.

Figure 2:
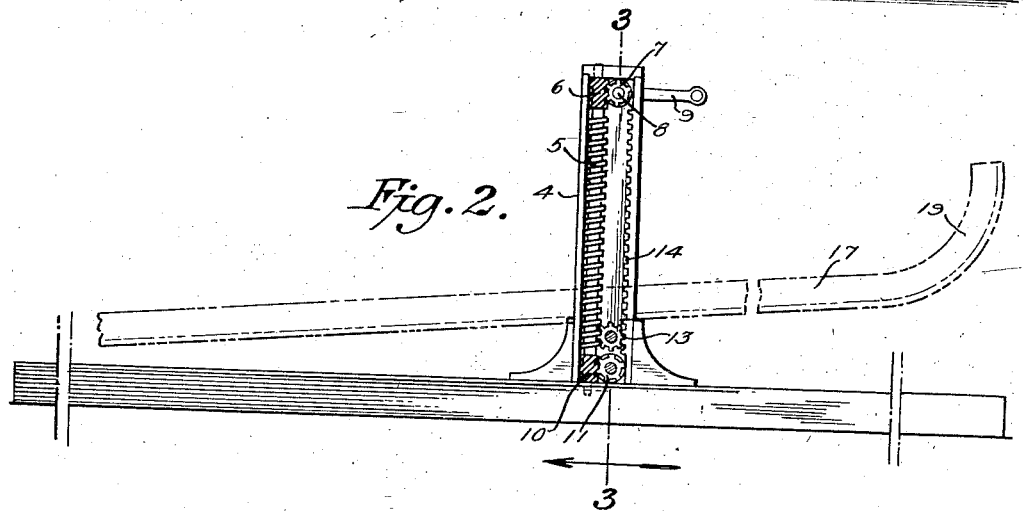
Fig. 2 is a view in vertical longitudinal section.
Figure 3:
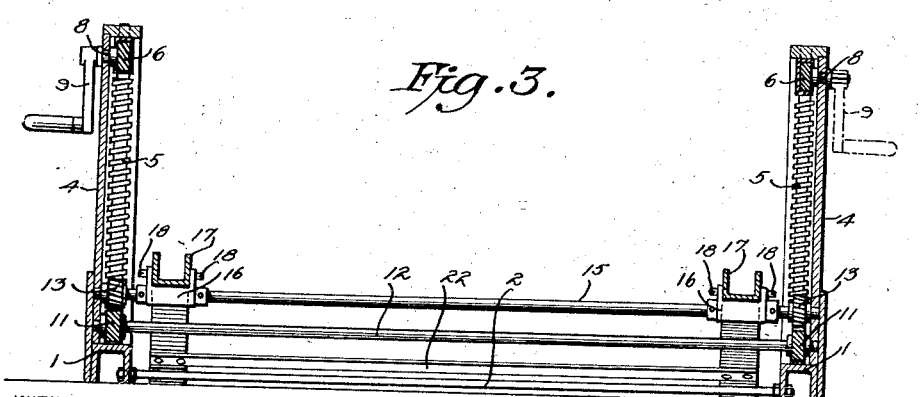
Fig. 3 is a view in transverse section on the line 3—3 of Fig. 2.

The tracks 17 at one end are curved upwardly, as shown at 19, to limit the movement of the wheels 20 of an automobile 21 when the latter is moved onto the tracks. Normally, when the tracks are in their lowered position, the straight ends of the tracks rest upon the ground with the tracks supported at an incline, as indicated in Fig. 2. In this position the wheels of an automobile can be readily run onto the channel tracks 17 and when they reach the extreme of the movement with the wheels of the automobile against the curved ends 19, the tracks will tilt to the position shown in Fig. 1. The operator can then turn the crank 9 to transmit motion to the screws 5 and the pinions 13, as above explained, to cause the pinions 13 to move upwardly on the racks 14 and elevate or tilt the automobile to any desired angle and elevation. It is desirable, of course, to secure the rear wheels of the automobile to the track by scraps or other securing means, not shown, to prevent possibility of accident.

By reason of the construction above described, the automobile can be conveniently elevated or tilted so as to permit a thorough inspection of the under portions thereof and this work can be done with the minimum of power and expenditure.

The tracks 17 may be connected and strengthened in any desired manner and I have shown crossbars 22 for this purpose.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. An automobile jack, comprising a support, uprights on the support, vertical screws supported by the uprights, pinions meshing with the screws and movable vertically by the screws, stationary vertical racks engaged by the pinions, a shaft connecting the pinions, tracks supported on the shaft, and means for turning the screws.

2. An automobile jack, comprising a support, uprights on the support, vertical screws supported by the uprights, pinions meshing with the screws and movable vertically by the screws, stationary vertical racks engaged by the pinions, a shaft connecting the pinions, tracks supported on the shaft, short shafts supported at the upper ends of the uprights and adapted to receive crank arms, and means operatively connecting said short shafts with the screws.

3. An automobile jack, comprising a support, uprights on the support, vertical screws supported by the uprights, pinions meshing with the screws and movable vertically by the screws, stationary vertical racks engaged by the pinions, a shaft connecting the pinions, tracks supported on the shaft, short shafts supported at the upper ends of the uprights and adapted to receive crank arms, means operatively connecting said short shafts with the screws, and means compelling the screws of both uprights to turn together.

4. An automobile jack, comprising a base, hollow uprights on the base, vertically positioned screws mounted to turn in the uprights, a transverse shaft, gears connecting the shaft and screws compelling the screws to turn together, stationary vertical racks engaged by the pinions, means for turning either of the screws, pinions in the uprights meshing with the screws and moved vertically thereby, a shaft connecting the pinions, parallel tracks mounted on the last-mentioned shaft and having upwardly curved ends.

5. An automobile jack, comprising parallel base bars, rods connecting the base bars, hollow uprights on the base bars, vertically positioned screws mounted to turn in the hollow uprights, a transverse shaft, gears connecting the transverse shaft and the screws compelling them to turn together, means at the upper ends of the uprights for turning the screws, a second transverse shaft, pinions on the second-mentioned shaft meshing with the screws, stationary racks in the uprights meshing with the pinions, parallel channel iron tracks supported on the last-mentioned shaft, and bars connecting the tracks.

WILLIAM HENRY BUTTERS.